Dec. 15, 1936.  J. PLAVAN  2,064,687
FARMING IMPLEMENT
Filed Sept. 14, 1935  4 Sheets-Sheet 1
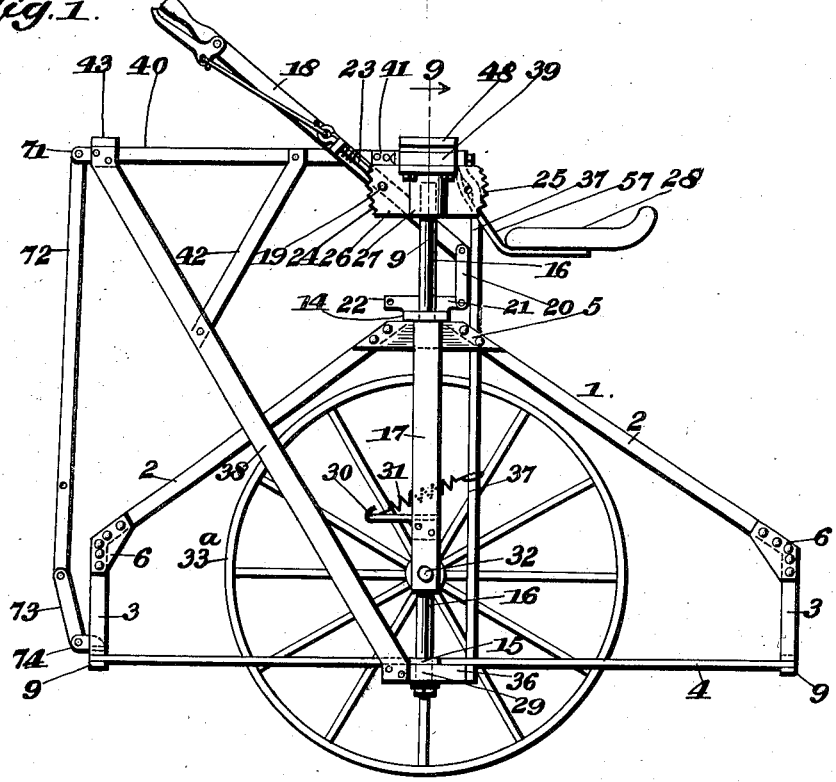
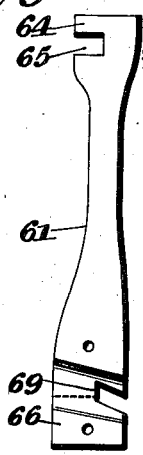
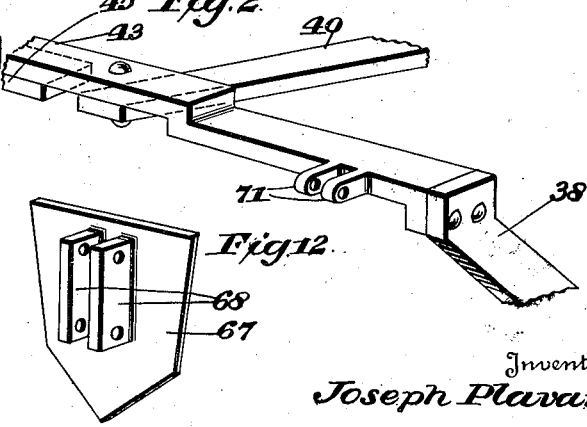
Inventor
Joseph Plavan Dec. 15, 1936.  J. PLAVAN  2,064,687
FARMING IMPLEMENT
Filed Sept. 14, 1935   4 Sheets-Sheet 2
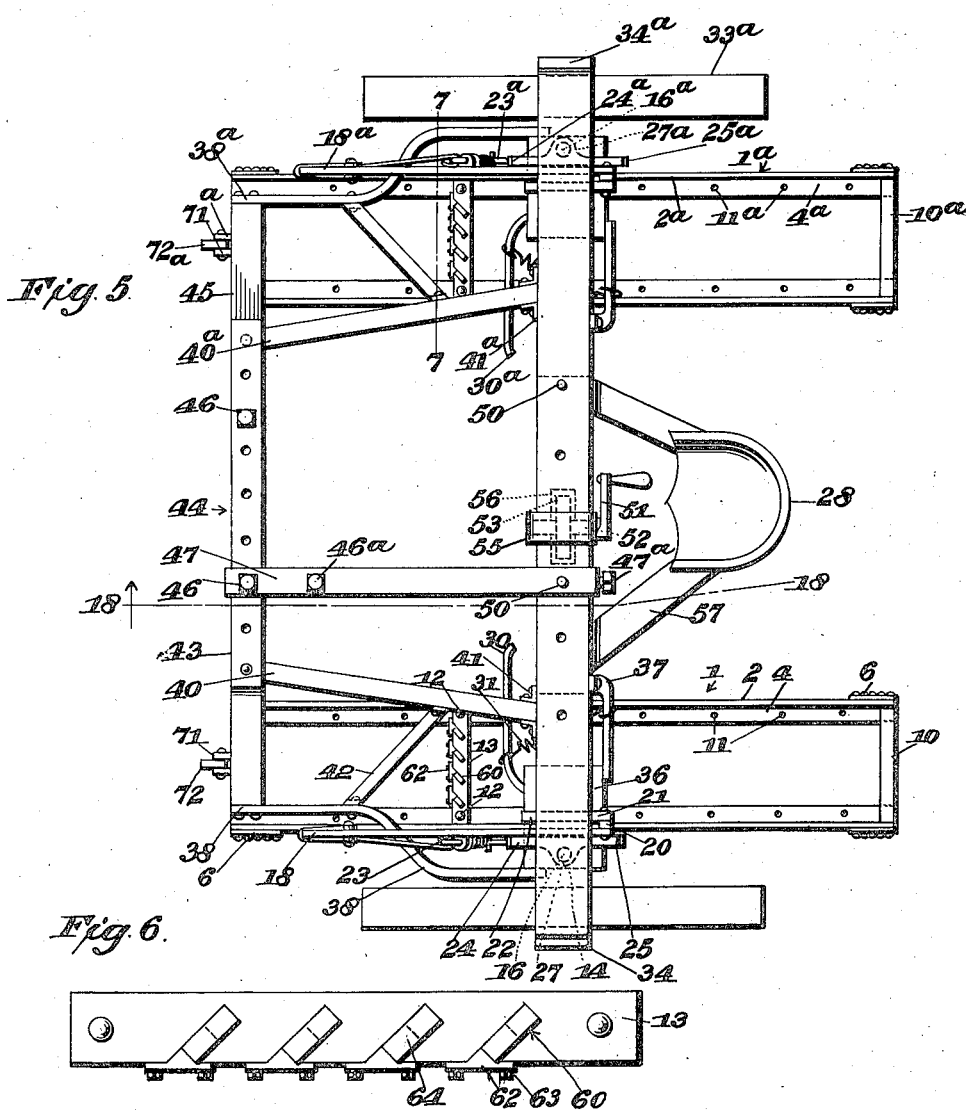
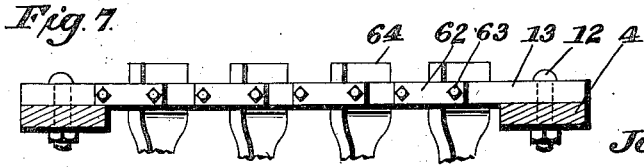
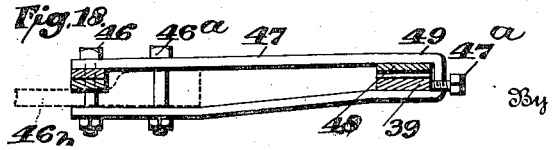

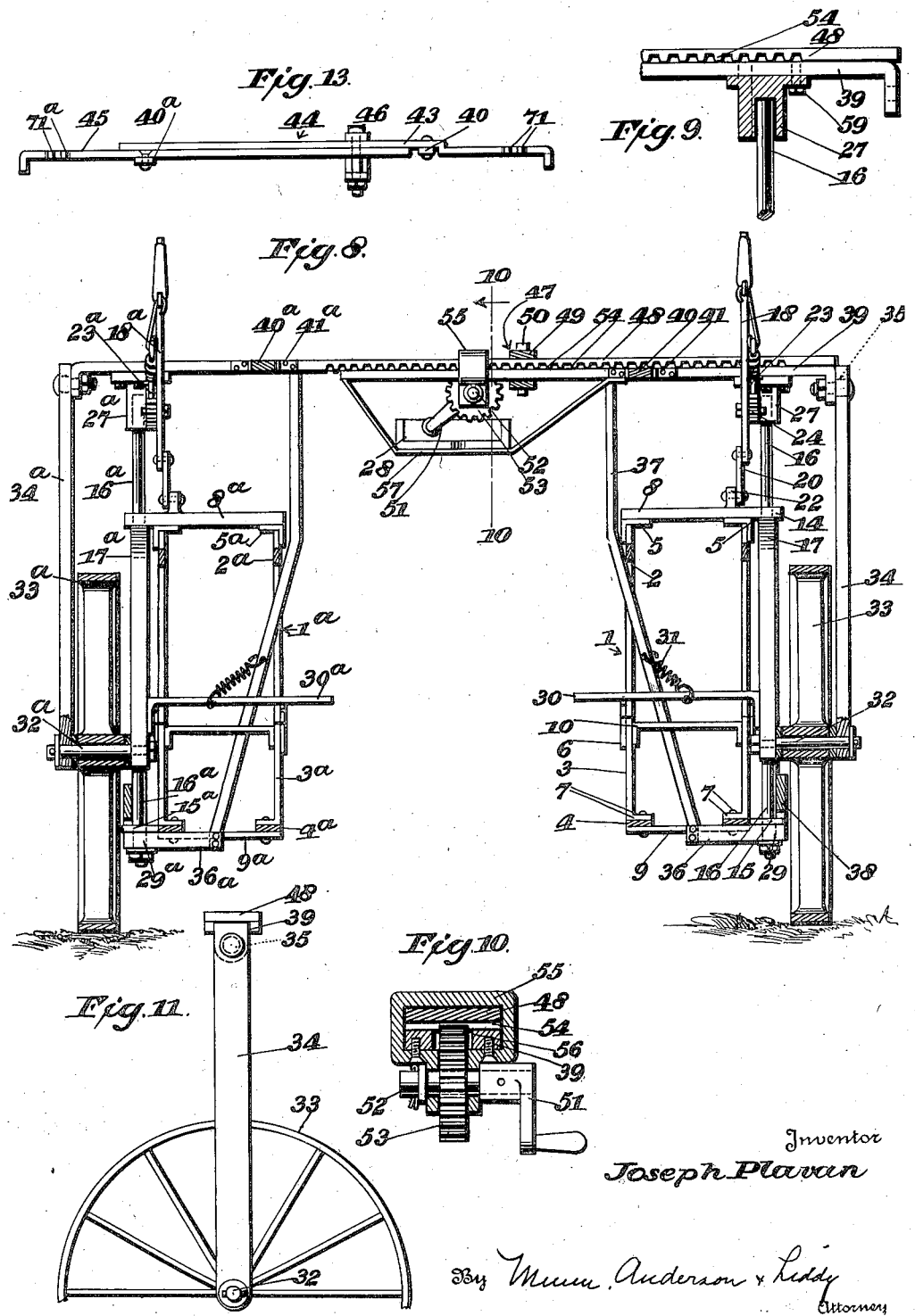

Dec. 15, 1936. J. PLAVAN 2,064,687
FARMING IMPLEMENT
Filed Sept. 14, 1935 4 Sheets-Sheet 4
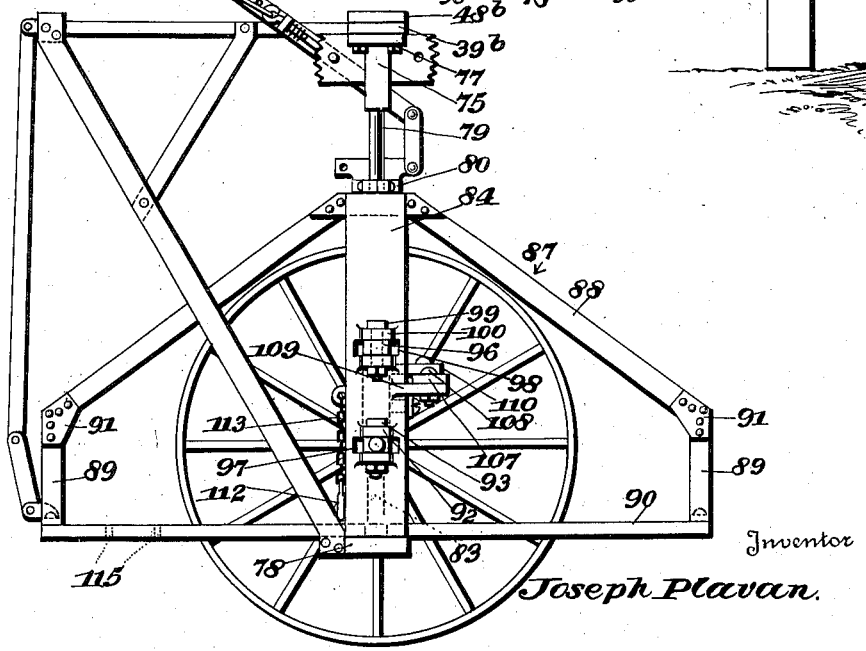

Patented Dec. 15, 1936

2,064,687

UNITED STATES PATENT OFFICE 2,064,687

FARMING IMPLEMENT

Joseph Plavan, Cleveland, Ohio

Application September 14, 1935, Serial No. 40,645

11 Claims. (Cl. 97—157)

This invention relates to improvements in farming implements, especially in the class of plows and cultivators, and its objects are as follows:—

First, to provide an implement which is so constructed as to have a variety of earth-working tools interchangeably attached to it, such as plows, harrows, spades, etc.

Second, to adapt the implement for use either with a single horse or a team of horses, or, if circumstances make it possible, with a motor driven tractor, any of these sources of power being applicable to the implement with but very little change in its set-up.

Third, to mount the foregoing tools on vertically shiftable frames which are capable of being raised and lowered by the driver from his position on the seat, so as to set the tools at the desired altitude with respect to the ground.

Fourth, to provide an adjustment by which the width of the tread of the implement can be regulated at will, so as to make it either wider or narrower than a given original setting.

Fifth, to provide for an independent turning of the wheels by the effort of the driver so as to enable running the implement around obstructions, such as rocks, plants, etc.

In the drawings:—

Figure 1 is a side elevation of the improved implement which is hereinafter known as a cultivator, the wheel nearest the observer being left off so as to show the frame structure to better advantage.

Figure 2 is a detail perspective view of a portion of a certain front member hereinafter referred to, together with some of its associated bracing.

Figure 3 is a side elevation of a bracket which is herein used to enable the attachment of any one of a variety of earth-working tools to the cultivator.

Figure 4 is an end view of the foregoing bracket.

Figure 5 is a plan view of the cultivator.

Figure 6 is a detail plan view of one of the cross pieces to which the foregoing bracket is secured.

Figure 7 is a detail sectional view taken substantially on the line 7—7 of Figure 5, illustrating another aspect of the cross piece, each of Figures 6 and 7 having a plurality of the brackets attached thereto.

Figure 8 is a partially front elevational and sectional view of the cultivator.

Figure 9 is a detail section taken substantially on the line 9—9 of Figure 1.

Figure 10 is a cross section taken on the line 10—10 of Figure 8.

Figure 11 is a detail elevation of the support which aids in stabilizing one of the ground wheels.

Figure 12 is a detail view of a spade-type of tool to be used on the cultivator.

Figure 13 is a detail front elevation of the hitch bar.

Figure 14 is a front elevation of approximately one-half of the implement embodying a modified construction, parts being shown in section.

Figure 15 is a detail side elevation of the modification in Figure 14, the near ground wheel being omitted.

Figure 16 is a detail horizontal section taken on the line 16—16 of Figure 14.

Figure 17 is a detail cross section taken on the line 17—17 of Figure 16.

Figure 18 is a cross section taken on the line 18—18 of Fig. 5 and showing how arm is used in attaching a pole for a two-horse team.

In carrying out the invention provision is made of a wheeled carriage on which a framework, generally designated 1, is vertically movably mounted for the purpose of carrying the various earth-working tools necessary for cultivating the ground. This framework is duplicated on each side of the longitudinal, vertical, plane of the implement (Figs. 5 and 8), and the description which now follows applies to the left side as well as to the right, corresponding reference numerals designating similar parts with the exception that those applied to the left side have the exponent letter $a$. The framework 1 consists of parallel top members 2, uprights 3 and bottom members 4, all firmly secured together at their meeting places, or substantially so, by angle irons 5 (Fig. 8), gussets 6 (Fig. 1) and bends and rivets collectively designated 7.

The arrangement described makes a rigid structure. It is provided in pairs, as already indicated by the statement of the top members being parallel, there being connecting spanners 8 at the top, 9 at the bottom and 10 in intermediate positions. The bottom members 4 are thus spaced apart, and each is provided with a series of holes 11 for the purpose of receiving the bolts 12, or equivalent means, for securing one or more cross pieces 13 in spanning positions, these cross pieces being adapted to carry the tools indirectly. Vertically registering holes in an extension 14 of the spanner 8 and an extension 15 of one of the bottom members contain the cylindrical portions 16 of an upright member 17. This member provides means on which the framework 1 is vertically slidable for the purpose of setting the tools at the desired altitude from the ground. The setting is accomplished by a lever 18 which is temporarily pivoted at 19 (Fig. 1), and has a link connection 20 to one of a pair of ears 21, 22 (Fig. 1) on the top spanner 8. The lever carries a detent 23.

This detent is engageable with one or the other of two sets of rack teeth 24, 25 (Fig. 1) on wings 26 that extend from a top bearing 27. The pivot 19 can be established on either of the two wings, depending upon whether the lever 18 is to be actuated by the operator on the tractor (not shown) or by the horse driver on the seat 28. According to the present showing the lever extends within reach of the tractor operator, and when the lever is reversed in position for the latter purpose, the link 20 will be connected with the forward ear 22, and not the rear ear 21.

Said bearing 27 is one of a pair of bearings, the bottom bearing being designated 29 (Fig. 8), by which the upright member 17 is turnably carried. Turning is accomplished by the foot pressure of the driver against a foot rest 30 which is affixed at one end to the upright member. A spring 31 returns the foot rest when pressure is released. The member 17 has a spindle 32 rigidly secured to it. This spindle turnably carries a ground wheel 33. The outer end of the spindle is mounted in the lower end of a swingable support 34 (Figs. 8 and 11), parallel to the upright 17. When it is desired to turn the ground wheel so as to avoid an obstruction, the driver will press forwardly on the foot rest 30, causing turning of the upright member 17 with respect to the framework 1. This deviation of the wheel 33 will not noticeably affect the other ground wheel 33ª or the direction of travel of the implement because the obstruction is soon passed whereupon the wheel 33 is immediately restored to its former position.

The resulting arcuate motion of the free end of the spindle 32 swings the support 34, but the pivot 35 on which this support is mounted is loose and high enough to enable said arcuate motion to take place without appreciable binding. The support 34 stabilizes the free end of the spindle 32, but actually it can be omitted, relying solely on the rigidness of the connection of the spindle with the upright member for the maintenance of the spindle in its proper position.

A base 36 provides a rest for the framework 1 when in its lowest position (Figs. 1 and 8). This base is rigidly supported by a plurality of brace rods 37, 38. These extend upwardly. The brace rod 37, of which there may be more than one, is secured at its ends to the base 36 and a top bar 39. The brace rod 38 is secured at its ends to the base 36 (Fig. 1) and to a strut 40 which extends forwardly of the top bar 39. The strut is secured to the latter as at 41 (Fig. 8). A brace 42 is secured at its ends to the rod 38 and strut 40. This arrangement makes the strut 40 rigid, and the purpose of the strut and its braces 38, 42 is to firmly carry one part 43 of a hitch bar 44, the other part 45 being overlapped by a part 43, and the two parts have holes which are intended to be registered for the insertion of bolts 46 so that the hitch bar can be held to such adjustments as are made when the implement is set for a given tread distance between the ground wheels.

One of these bolts, in addition to occupying the registering holes, also occupies a hole in the forward ends of a forked arm 47 (Figs. 5 and 18) which extends back to the rack and top bar 39. An extra bolt 46ª aids in securing a pole 46ᵇ (Fig. 18) for a two-horse team. The pole is inserted between the forks of the arm 47. A set screw 47ª is driven through the bend in the arm and against one of the adjacent bars to maintain the arm in a straight position. An alternative provision is made for hitching horses to the hitch bar 44, and is presently described. The top bar has a rack bar 48 superposed upon it, and the adjacent bent end of the arm 47 is looped around the two bars at 49 (Fig. 18) so as to embrace the two bars and assist the holding function of pins 50 which are inserted in holes in the two bars when brought into registration. The previously mentioned wheeled carriage chiefly consists of the top bar structure 39, 48, the support 34 (when used) and the various upright members such as 17 and 37 (Fig. 8).

The occasion for resetting the pins 50 and bolt 46 (Fig. 5) arises when a change in the tread distance between the ground wheels is to be made. It has been stated already that the hitch bar 44 consists of the overlapping parts 43, 45 (Fig. 13). A similar arrangement obtains in the top and rack bars 39, 48 which are overlapped also (Fig. 8). When the top and rack bars are slid with reference to each other to change the tread distance, the hitch bar 44 must be adjusted accordingly. Sliding of the top and rack bars is accomplished by the turning of a crank 51 (Fig. 10) on a shaft 52 which carries a gear 53 that is in permanent mesh with the teeth 54 on the underside of the rack bar 48. An embracement 55 around the two bars 39, 48, is secured to the bar 39 (Fig. 10), and has a bearing formation on the underside for the shaft 52. The bar 39 has a slot 56 which is occupied by the top sector of the gear in reaching the rack teeth.

Supports 57 extend rearwardly from the top bar 39 and carry the seat 28 for the driver. The bar 39 has the previously described top bearing 27 secured to it by means of bolts 59 (Fig. 9), the bearing being flanged for the purpose. The outer end of the bar is turned down to sustain the pivot 35. This pivot comprises a two-diametered bolt which is tightly clamped in place by a nut on the threaded small end, the support 34 swinging on the large-diametered part in the manner previously described. The spring 31 (Fig. 8), is connected at its ends to the foot rest 30 and the brace rod 37.

Attention is again directed to the cross piece 13 (Fig. 5). This cross piece is temporarily affixed to the bottom members 4 in desired cross positions anywhere along the length of the bottom members by means of the bolts 12 in the holes 11. The cross piece has a series of slots 60 (Fig. 6) formed at an angle to one longitudinal front end at which there is an entrance. One or more brackets 61 (Figs. 3 and 7) are secured in as many slots by clamps 62 which are secured to the cross piece 13 in closing positions across the slots by bolts 63.

The head 64 (Fig. 3) of the bracket 61 is slotted at 65 to engage the cross piece 13 as shown in Figure 6. The foot 66 (Fig. 3) of the bracket 61 is formed to take any one of a variety of tools. One type of tool is shown in Figure 12. This consists of a spade 67 which has parallel lugs 68 on back to fit on the sides of the foot 66. Both the foot and the lugs have holes which are intended to be registered so as to contain securing means. The foot 66 has other formations 69, 70 (Figs. 3 and 4) which adapt it to other types of tools (not shown).

For the purpose of applying drawing power the hitch bar part 43 carries lugs 71 (Figs. 1 and 2) to which a jointed draft bar 72, 73 is pivotally attached. The reason for jointing the draft bar is to enable its adaptation to the vertical adjustments of the framework. Its member 73 is pivoted to a bracket 74 (Fig. 1) on the framework 1. The other member is used as a place of connection for the whiffle tree of the draft rig of a team of horses. In case a single horse is used it is proposed to secure a one-horse attachment (not shown) to the corresponding draft bar, or in the case of a tractor, the tractor hitch will be attached to a clevis on a cross bar (not shown), positioned between the draft bars.

Attention is now directed to the modified form in Figs. 14 to 17. The construction here shown relates chiefly to a difference in the means for turning the ground wheels on a vertical axis so as to avoid obstructions. The top bar construction, consisting of the top bar 39$^b$ and rack bar 48$^b$ is the same in construction and operation as according to Figure 8, the only exception being the omission of a place on which to attach an equivalent pivot 35 (Fig. 8), the pendent support 34 shown there being left off to illustrate the previous statement that the support can be omitted. The remaining top bar structure is not specifically described because this would only be a repetition of previous statements.

A pair of uprights 75, 76 is made pendent from the top bar structure, each being firmly and immovably secured to the top bar 39$^b$ at 77. These uprights are held in parallelism by a base 78 to which their free ends are firmly secured in any desired way. The upright 75 does not turn, as in the instance of its otherwise equivalent 17. Said uprights have cylindrical portions 79 on which a top spanner 80 is vertically slidable. A somewhat similar bottom spanner 81 is vertically slidable on a cylindrical portion 82 of the upright 76 and on a cylindrical rod 83 which is independent of the upright 75 and is formed so that its ends can be attached to the base 78 and to a cross-sectionally rectangular part 84 of the upright 75 as shown (Fig. 14). The upright 76 has a similar cross-sectionally rectangular part 85.

The top and bottom spanners 80, 81, and intermediate spanners 86 (Fig. 14), are parts of a framework, generally designated 87 (Fig. 15), which is practically the same in structure and identical in principle to the framework 1 (Fig. 1). Being so, it includes top, upright and bottom members 88, 89, 90, all parallel to each other, and connected at the corner by riveted gussets 91.

A pair of lugs 92 with a vertical bolt 93 therethrough provide a pivot on which the wheel spindle 94 can be turned horizontally. The spindle is made as one branch of a carrying member 95, the other branch 96 of which extends parallel to the spindle branch but is not as long. Both branches occupy slots 97, 98 in the part 84, the free end of the branch 96 being pivoted by a bolt 99 between a pair of lugs 100. The ground wheel 101 is rotatably carried by the spindle 94. The pivots 93, 99 are in vertical alinement, and when the carrying member 95 is turned the ground wheel is accordingly turned in one direction or the other so as to avoid obstructions, as already set out.

This turning is accomplished by a pedal 102 or its equivalent. The pedal is pivoted at 103 on a bracket 104 that extends out from the rectangular part 85. A headed pin 105 on the upper end of the pedal occupies and loosely works in an opening 106 in one end of a bar 107 (Fig. 16). The other end of the bar is pivoted at 108 to a bracket 109 on the rectangular part 84. A link 110 is pivoted at its ends to the bar 107 and to an ear 111 or back of the carrying member 95. Motions imparted to the pedal 102 by one foot of the driver are transmitted through the bar 107 and link 110 to the carrying member 95 for the purpose already stated.

Should it be desired to lock the carrying member 95 in a given position with reference to the framework 87 a pin 112, ordinarily hanging loose on an anchored chain 113, is inserted through registering holes in lugs 114 and in the spindle branch 94, between which lugs said branch is situated as shown.

The underlying purpose of the framework 87 is identical with that of the framework 1 (Fig. 1), namely to carry one or more earth-working tools. This is accomplished by the same cross piece 13 (Fig. 6) and attached bracket 61. Neither of these parts is shown in modified form, but the bottom members 90 are provided with a series of holes 115 (Fig. 15) for the purpose of containing the securing means.

The operation is readily understood. It is to be borne in mind that the entire description which was largely based on the structure at the right side of the implement (Fig. 8), applies to the left side as well. From what has been stated it will be understood that the implement is laterally extensible, as by adjusting the bars 39, 48 with respect to each other (Fig. 8); the frameworks 1, 1$^a$ are vertically adjustable as by manipulating the levers 18, 18$^a$; and the ground wheels 33, 33$^a$ are turnable with respect to both the frameworks and the top bar structure by foot pressure on the rests 30, 30$^a$.

The first function is accomplished by turning the crank 51. This moves the bars 39, 48 in simultaneously opposite directions so as to either space the ground wheels farther away or closer together from an original setting. A corresponding adjustment of the hitch bar 44 is necessarily made, the adjustments of all bars being secured by the bolt 46 and pins 50.

It has been pointed out already that the cross piece 13 can be set where desired along the bottom members 4. All of the slots 60 may be filled with tool brackets 61, and more than one cross piece 13 can be used at a time on each framework 1, 1$^a$. The depth of penetration of the earth by the tools is regulated by the levers 18, 18$^a$, and as these are set to the desired adjustment, the respective framework slides vertically on the upright members 17, 17$^a$. It is this member that carries the respective ground wheel, and when said member is turned by means of the foot rest 30 in order to turn the ground wheel for the avoidance of some obstruction, said turning of the upright member occurs without disturbing the framework that it carries.

In the modified form in Figures 14 to 17 the lateral extensibility of the implement halves, the vertical adjustment of the tool-carrying frameworks and the horizontal turning of the ground wheels are each preserved, the only exception being concerned with the structure for horizontally turning the ground wheels. For this purpose the pedal 102 is connected with the carrying member 95 which has branches 94, 96 of different lengths, the one ending in the spindle for the ground wheel, and both being mounted on vertically coaxial pivots. The carrying member 95 is turnable with respect to the upright 75, and this upright is not turnable as is its equivalent 17 (Fig. 8).

I claim:—

1. In a farming implement, a wheeled carriage, said carriage including at least one upright, a framework and means forming part of the framework so mounted on the upright that the framework is rectilinearly movable with respect thereto in the vertical direction, means on the carriage and in connection with the framework for adjusting the framework on the upright with respect to the ground, at least one tool-carrying bracket, and means by which said bracket is attached to the framework.

2. In a farming implement, a wheeled carriage, said carriage including at least one vertical upright, a movable framework which includes top and bottom spanners slidably attached to the upright so that the framework is subject to vertical adjustment, means mounted on the carriage and having connection with the framework for vertically adjusting the framework and holding it to its adjustments, a tool-carrying bracket which has a slotted head, a slotted cross piece with the slot of which said head is interfitted, means to secure the head on the cross piece, and means to secure the cross piece to the framework.

3. In a farming implement, a carriage, said carriage including at least one vertical upright, means which is also part of the carriage supporting the upright for turning on its vertical axis, a tool-carrying framework, and means included therein by which the framework is attached to the upright for vertical motion, means mounted on the carriage and connected with the framework for moving the framework in respect to the upright and adjusting its tools with respect to the ground, a ground wheel and means by which it is mounted on the upright for rotation, and means by which to turn the upright with respect to the framework so as to steer the ground wheel around obstructions.

4. In a farming implement, a carriage which includes a horizontally turnable upright, a ground wheel and means by which said ground wheel is mounted on the upright for rotation in the vertical plane, a tool-carrying framework vertically slidably mounted on the upright, means for vertically adjusting the framework on the upright without disturbing the position of the ground wheel, and means to turn the upright for steering the ground wheel around an obstruction without disturbing the position of the framework.

5. In a farming implement, a wheeled carriage, said carriage including at least one upright and a base with which the lower end of the upright is connected, a tool-carrying framework which includes top and bottom spanners, each with means connected to the upright for vertical sliding movement on the upright, the bottom spanner being supportable by the base, and means mounted on the carriage and in connection with the framework for lifting the framework from the base and raising the tools from the ground.

6. In a farming implement, a carriage which includes a swingable support and an upright substantially parallel therewith, means also included in the carriage in which the upright is mounted for horizontal turning, a spindle affixed to the upright and having its free end carried by the support, a ground wheel mounted on the spindle, and means attached to the upright enabling turning of the upright so as to steer the wheel, said support swinging as the spindle is shifted.

7. In a farming implement, a carriage which includes rigid uprights, a spindle and means by which it is mounted on one of the uprights so as to turn horizontally, said means having an ear and said upright having a bracket, a ground wheel rotatably carried by the spindle, a pedal and means by which the pedal is turnably mounted on another upright, and a bar pivotally attached to the bracket at one end and loosely connecting the pedal at the other end, said bar having a link connecting it with said ear.

8. In a farming implement, a carriage which includes a pair of rigid uprights, a base to which both of the uprights and a rod are connected, a tool-carrying framework which includes a top spanner slidably connected with both uprights and a bottom spanner slidably connected with one upright and with said bar, and means mounted on the carriage and in connection with the top spanner for moving the framework so as to adjust its tools with respect to the ground.

9. In a farming implement, a carriage which includes two rigid uprights one of which has a pair of slots, lugs adjacent to the slots and a bracket on the respective upright, a carrying member which has branches occupying the slots, there being means to pivotally connect the branches with the lugs, one of the branches constituting a spindle for a ground wheel, an ear on the carrying member, a pedal and means which is turnably mounted on the other upright, a bar pivotally attached to the bracket at one end and loosely connected with the pedal at the other end, and a link connecting the bar with said ear.

10. In a farming implement, a carriage, a ground wheel spindle and a carrying member of which the spindle is a part, lugs and bolts pivotally connecting the carrying member to the lugs, means connected with the carrying member for turning it on its pivot bolts, at least one lug with a hole mounted on the carriage, said carrying member having a hole which is registrable with the hole in said lug, and a pin having a loose connection with the carriage, said pin being insertable in the registrable hole to lock the carrying member against turning.

11. In a farming implement, a wheeled carriage which includes at least one upright, a tool-carrying framework which has means that is slidably connected to the upright, said framework having ears extending forwardly and rearwardly, and means which is operable from different positions relatively to the carriage for sliding the framework and so changing the altitude of the tools with respect to the ground, said means comprising a pair of rack wings extending forwardly and rearwardly of the carriage to match the ears, each wing having a set of rack teeth and a hole for a pivot, a lever and means by which it is connected with one of the ears, and a pivot pin which is inserted through the lever and one of the holes.

JOSEPH PLAVAN.